United States Patent
Kennedy (10) Patent No.: US 9,470,214 B2
(45) Date of Patent: Oct. 18, 2016

(54) RECIPROCAL SPRING ARRANGEMENT FOR POWER GENERATION SYSTEM

(71) Applicant: Kinetic Energy Corporation, Columbia, MD (US)

(72) Inventor: Eugene J. Kennedy, Philadelphia, PA (US)

(73) Assignee: Kinetic Energy Corporation, Columbia, MD (US)

( * ) Notice: Subject to any disclaimer, the term of this patent is extended or adjusted under 35 U.S.C. 154(b) by 455 days.

(21) Appl. No.: 13/914,564

(22) Filed: Jun. 10, 2013

(65) Prior Publication Data

US 2014/0084596 A1 Mar. 27, 2014

Related U.S. Application Data

(63) Continuation of application No. 12/695,146, filed on Jan. 27, 2010, now Pat. No. 8,466,571, and a continuation of application No. 12/695,132, filed on Jan. 27, 2010, now Pat. No. 8,461,700, and a (Continued)

(51) Int. Cl.
*B60L 1/00* (2006.01)
*F03G 7/08* (2006.01)

(52) U.S. Cl.
CPC ............... *F03G 7/08* (2013.01); *Y10T 307/50* (2015.04)

(58) Field of Classification Search
CPC .............................. F03G 7/08; Y10T 307/50
USPC ........................................................ 307/9.1
See application file for complete search history.

(56) References Cited

U.S. PATENT DOCUMENTS

| 1,312,131 A | 8/1919 | Morton |
|---|---|---|
| 1,771,200 A | 7/1930 | Akers |
| 1,916,873 A | 7/1933 | Wiggins |
| 3,748,443 A | 7/1973 | Kroll et al. |
| 3,859,589 A | 1/1975 | Rush |
| 3,885,163 A | 5/1975 | Toberman |

(Continued)

FOREIGN PATENT DOCUMENTS

| CH | 1986/007504 A1 | 12/1986 |
|---|---|---|
| CN | 201045331 Y | 4/2008 |

(Continued)

OTHER PUBLICATIONS

Lee W. Young, International Search Report, PCT/US2009/066024 Apr. 2, 2010, p. 2, Alexandria, VA, US.

(Continued)

*Primary Examiner* — Jared Fureman
*Assistant Examiner* — Duc M Pham
(74) *Attorney, Agent, or Firm* — John J. Dresch; Dresch IP Law, PLLC (57) ABSTRACT

A vehicle energy harvester including a subunit having an upper surface forming a roadway surface; a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface; a generator that generates power in response to movement of the vehicle activated treadle from the first position to the second position and from the second position to the first position.

14 Claims, 4 Drawing Sheets

Related U.S. Application Data continuation of application No. 12/695,136, filed on Jan. 27, 2010, now Pat. No. 8,461,701, and a continuation of application No. 12/695,139, filed on Jan. 27, 2010, now Pat. No. 8,466,570, and a continuation of application No. 12/695,143, filed on Jan. 27, 2010, now Pat. No. 8,471,395, and a continuation of application No. 12/695,148, filed on Jan. 27, 2010, now Pat. No. 9,212,654.

(60) Provisional application No. 61/147,747, filed on Jan. 27, 2009, provisional application No. 61/147,748, filed on Jan. 27, 2009, provisional application No. 61/147,749, filed on Jan. 27, 2009, provisional application No. 61/147,750, filed on Jan. 27, 2009, provisional application No. 61/147,752, filed on Jan. 27, 2009, provisional application No. 61/147,754, filed on Jan. 27, 2009.

(56) References Cited

U.S. PATENT DOCUMENTS

| | | |
|---|---|---|
| 3,918,844 A | 11/1975 | Bailey |
| 3,944,855 A | 3/1976 | Le Van |
| 4,004,422 A | 1/1977 | Le Van |
| 4,081,224 A | 3/1978 | Krupp |
| 4,115,034 A | 9/1978 | Smith |
| 4,130,064 A | 12/1978 | Bridwell |
| 4,211,078 A | 7/1980 | Bass |
| 4,212,598 A | 7/1980 | Roche et al. |
| 4,228,360 A | 10/1980 | Navarro |
| 4,238,687 A * | 12/1980 | Martinez ............... H02K 7/1853 290/1 R |
| 4,239,974 A | 12/1980 | Swander et al. |
| 4,239,975 A | 12/1980 | Chiappetti |
| 4,247,785 A | 1/1981 | Apgar |
| 4,250,395 A | 2/1981 | Lundgren |
| 4,309,150 A | 1/1982 | Payne |
| 4,322,673 A | 3/1982 | Dukess |
| 4,339,920 A | 7/1982 | Le Van |
| 4,409,489 A | 10/1983 | Hayes |
| 4,418,542 A | 12/1983 | Ferrell |
| 4,434,374 A | 2/1984 | Lundgren |
| 4,437,015 A | 3/1984 | Rosenblum |
| 4,614,875 A | 9/1986 | McGee |
| 4,700,540 A | 10/1987 | Byrum |
| 4,739,179 A | 4/1988 | Stites |
| 4,912,995 A | 4/1990 | Otters |
| 4,915,196 A | 4/1990 | Krisko |
| 4,944,474 A | 7/1990 | Jones |
| 4,980,572 A | 12/1990 | Sen |
| 5,119,136 A | 6/1992 | Morikawa |
| 5,157,922 A | 10/1992 | Baruch |
| 5,250,769 A | 10/1993 | Moore |
| 5,347,186 A | 9/1994 | Konotchick |
| 5,355,674 A | 10/1994 | Rosenberg |
| 5,449,909 A | 9/1995 | Kaiser et al. |
| 5,634,774 A | 6/1997 | Angel et al. |
| 5,648,645 A | 7/1997 | Arpagaus et al. |
| 5,678,933 A | 10/1997 | Ouchi et al. |
| 5,977,742 A | 11/1999 | Henmi |
| 5,984,432 A | 11/1999 | Otomo et al. |
| 6,023,134 A | 2/2000 | Carl et al. |
| 6,091,159 A | 7/2000 | Galich |
| 6,116,704 A | 9/2000 | Nakakita et al. |
| 6,172,426 B1 | 1/2001 | Galich |
| 6,204,568 B1 | 3/2001 | Runner |
| 6,353,270 B1 | 3/2002 | Sen |
| 6,362,534 B1 | 3/2002 | Kaufman |
| 6,376,925 B1 | 4/2002 | Galich |
| 6,467,266 B1 | 10/2002 | Kanazawa et al. |
| 6,494,144 B1 | 12/2002 | Perez Sanchez |
| 6,580,177 B1 | 6/2003 | Hagood et al. |
| 6,662,099 B2 | 12/2003 | Knaian et al. |
| 6,718,760 B1 | 4/2004 | Padera |
| 6,734,575 B2 | 5/2004 | Ricketts |
| 6,756,694 B2 | 6/2004 | Ricketts |
| 6,767,161 B1 | 7/2004 | Calvo et al. |
| 6,812,588 B1 | 11/2004 | Zadig |
| 6,858,952 B2 | 2/2005 | Gott et al. |
| 6,894,233 B2 | 5/2005 | Dingwall et al. |
| 6,936,932 B2 | 8/2005 | Kenney |
| 6,969,213 B2 | 11/2005 | Rastegar et al. |
| 7,043,904 B2 | 5/2006 | Newman |
| 7,067,932 B1 | 6/2006 | Ghassemi |
| 7,102,244 B2 | 9/2006 | Hunter, Jr. |
| 7,145,257 B2 | 12/2006 | Ricketts |
| 7,148,581 B2 | 12/2006 | Hershey et al. |
| 7,239,031 B2 | 7/2007 | Ricketts |
| 7,315,088 B2 | 1/2008 | Erriu |
| 7,347,643 B2 | 3/2008 | Jeong |
| 7,371,030 B2 | 5/2008 | Hickman |
| 7,429,145 B2 | 9/2008 | Rastegar et al. |
| 7,541,684 B1 | 6/2009 | Valentino |
| 7,589,428 B2 | 9/2009 | Ghassemi |
| 7,629,698 B2 | 12/2009 | Horianopoulos et al. |
| 7,687,931 B2 * | 3/2010 | Gasendo ............... F03B 13/186 290/43 |
| 7,714,456 B1 | 5/2010 | Daya |
| 7,717,043 B2 | 5/2010 | Rastegar et al. |
| 8,466,571 B2 * | 6/2013 | Kennedy ............... F03G 7/08 290/1 R |
| 2002/0014314 A1 | 2/2002 | Miller |
| 2003/0132636 A1 | 7/2003 | Ricketts |
| 2003/0151381 A1 | 8/2003 | Kadota et al. |
| 2004/0066041 A1 | 4/2004 | Hunter, Jr. |
| 2005/0116545 A1 | 6/2005 | Hamel et al. |
| 2005/0143876 A1 | 6/2005 | Tanase |
| 2005/0200132 A1 | 9/2005 | Kenney |
| 2005/0268444 A1 | 12/2005 | Namerikawa et al. |
| 2006/0152008 A1 | 7/2006 | Ghassemi |
| 2006/0237968 A1 | 10/2006 | Chandrasekaran |
| 2007/0018803 A1 | 1/2007 | Lang |
| 2007/0020047 A1 | 1/2007 | Adair |
| 2007/0085342 A1 | 4/2007 | Horianopoulos et al. |
| 2007/0158945 A1 | 7/2007 | Annen et al. |
| 2007/0210652 A1 | 9/2007 | Tracy et al. |
| 2007/0264081 A1 | 11/2007 | Chiu |
| 2008/0224477 A1 | 9/2008 | Kenney |
| 2009/0315334 A1 | 12/2009 | Chen |

FOREIGN PATENT DOCUMENTS

| | | |
|---|---|---|
| CN | 201050452 Y | 4/2008 |
| CN | 201396254 Y | 2/2010 |
| JP | 2000310102 A | 11/2000 |
| JP | 2002161848 A | 6/2002 |

OTHER PUBLICATIONS

Blaine R. Copenheaver, International Search Report, PCT/US2009/066025 Mar. 10, 2010, p. 2, Alexandria, VA, US.
Lee W. Young, International Search Report, PCT/US2010/022287 Jun. 1, 2010, p. 2, Alexandria, VA, US.
Blaine R. Copenheaver, International Search Report, PCT/US2010/022288 Jul. 12, 2010, p. 2, Alexandria, VA, US.
Lee W. Young, International Search Report, PCT/US2010/022289 Jun. 1, 2010, p. 2, Alexandria, VA, US.
Lee W. Young, International Search Report, PCT/US2010/022291 Jun. 15, 2010, p. 2, Alexandria, VA, US.
Blaine R. Copenheaver, International Search Report, PCT/US2010/022294 Jun. 28, 2010, p. 2, Alexandria, VA, US.
Blaine R. Copenheaver, International Search Report, PCT/US2010/022296 Jul. 29, 2010, p. 2, Alexandria, VA, US.
Lee W. Young, International Search Report, PCT/US2010/020676 Jun. 15, 2010, p. 2, Alexandria, VA, US.
National Search Report CN2010800146126 dated Aug. 6, 2013.
National Search Report CN2010800146145 dated Jul. 26, 2013.
National Search Report CN2009801552247 dated Mar. 19, 2013.

* cited by examiner

RECIPROCAL SPRING ARRANGEMENT FOR POWER GENERATION SYSTEM

CROSS-REFERENCE TO RELATED APPLICATIONS

The present invention claims the benefit of U.S. Provisional Patent Application No. 61/147,747, filed Jan. 27, 2009, and entitled "TRANSIENT ABSORBER FOR POWER GENERATION SYSTEM", U.S. Provisional Patent Application No. 61/147,748, filed Jan. 27, 2009, and entitled "WEATHER RESPONSIVE TREADLE LOCKING MEANS FOR POWER GENERATION SYSTEM", U.S. Provisional Patent Application No. 61/147,749, filed Jan. 27, 2009, and entitled "LOW PROFILE, SURFACE-MOUNTED POWER GENERATION SYSTEM", U.S. Provisional Patent Application No. 61/147,750, filed Jan. 27, 2009, and entitled "VEHICLE SPEED DETECTION MEANS FOR POWER GENERATION SYSTEM", U.S. Provisional Patent Application No. 61/147,752, filed Jan. 27, 2009, and entitled "RECIPROCAL SPRING ARRANGEMENT FOR POWER GENERATION SYSTEM", and U.S. Provisional Patent Application No. 61/147,754, filed Jan. 27, 2009, and entitled "LOSSLESS SHORT-DURATION ELECTRICAL STORAGE MEANS FOR POWER GENERATION SYSTEM", the entire contents of which are incorporated herein by reference in their entirety.

FIELD OF THE INVENTION

The present invention is directed toward devices and methods of harvesting vehicle energy, and more specifically, toward a power generation system for harvesting vehicle energy having a reciprocal spring arrangement.

BACKGROUND OF THE INVENTION

Very few devices that capture energy from passing vehicles have been implemented, despite numerous designs put forth by various parties over the years. Issues of efficiency, reliability, and manufacturability, among others, have limited the practicality of vehicle energy harvesting devices. Added to the challenge is the variability of vehicle sizes, speeds, axle configurations, and lane positions, all of which can greatly influence the operation of a device trying to capture the motion energy of vehicles and convert it into a useful form of energy.

Therefore, a need exists for an energy capture device and method having improved efficiency, reliability, and manufacturability, as well as practicality. A need also exists for an energy capture device and method that takes into account the variability of vehicle sizes, speeds, axle configurations, and lane positions in converting the captured motion energy of vehicles into a useful form of energy.

SUMMARY OF THE INVENTION

These problems and others are addressed by the present invention, which provides a novel vehicle energy harvester that overcomes many of the issues with the conventional devices and is therefore better suited for real-world implementation than the conventional devices.

The exemplary embodiments of the invention make productive use of the energy that is normally wasted (in the form of heat) in reducing the speed of motor vehicles on exit ramps, toll plazas etc., etc. The vehicle energy harvester can absorb mechanical energy from passing (or breaking) vehicles and convert the mechanical energy to electrical energy using, for example, shaft driven generators.

The disclosed embodiments provide a vehicle energy harvester and power generation system that is simple to install, provides a short payback period, and has a scalable configuration. More particularly, the disclosed embodiments can provide a simple and reliable mechanical configuration that can withstand severe environments. The low cost configuration of the system may provide for faster payback of the expense of the system, and therefore, make the system more practical and desirable for practical applications.

Additionally, the ease with which the system can be installed also may make the system more practical and desirable for practical applications. The disclosed embodiments require little or no excavation and can be installed in a few hours, instead of over several days as with conventional devices.

The disclosed embodiment also can provide a scalable configuration that may be particularly advantageous for use at locations, such as exits ramps, toll plazas, hills, among other locations.

An embodiment also can include monitoring the status or operation of the unit, either periodically or 24 hours per day, seven days per week, using for example, a wireless link or other wired or wireless communication device.

The exemplary embodiments improve the durability of the system under practical use scenarios. The embodiments of the invention are capable of withstanding the stresses placed upon the system during normal use. The embodiments of the invention recognize that numerous factors may reduce the durability of the system under normal use including, for example, motor vehicles impacting the treadles at highway/freeway speeds of 60 to 70 miles per hour or more, and ice build-up restricting free movement of the treadle assembly, among other things.

The embodiments of the invention address and solve these problems and improve the durability of a treadle based energy conversion systems according to the embodiments of the invention. The embodiments of the invention also improve the conversion efficiency of the energy conversion systems.

Figure 1:
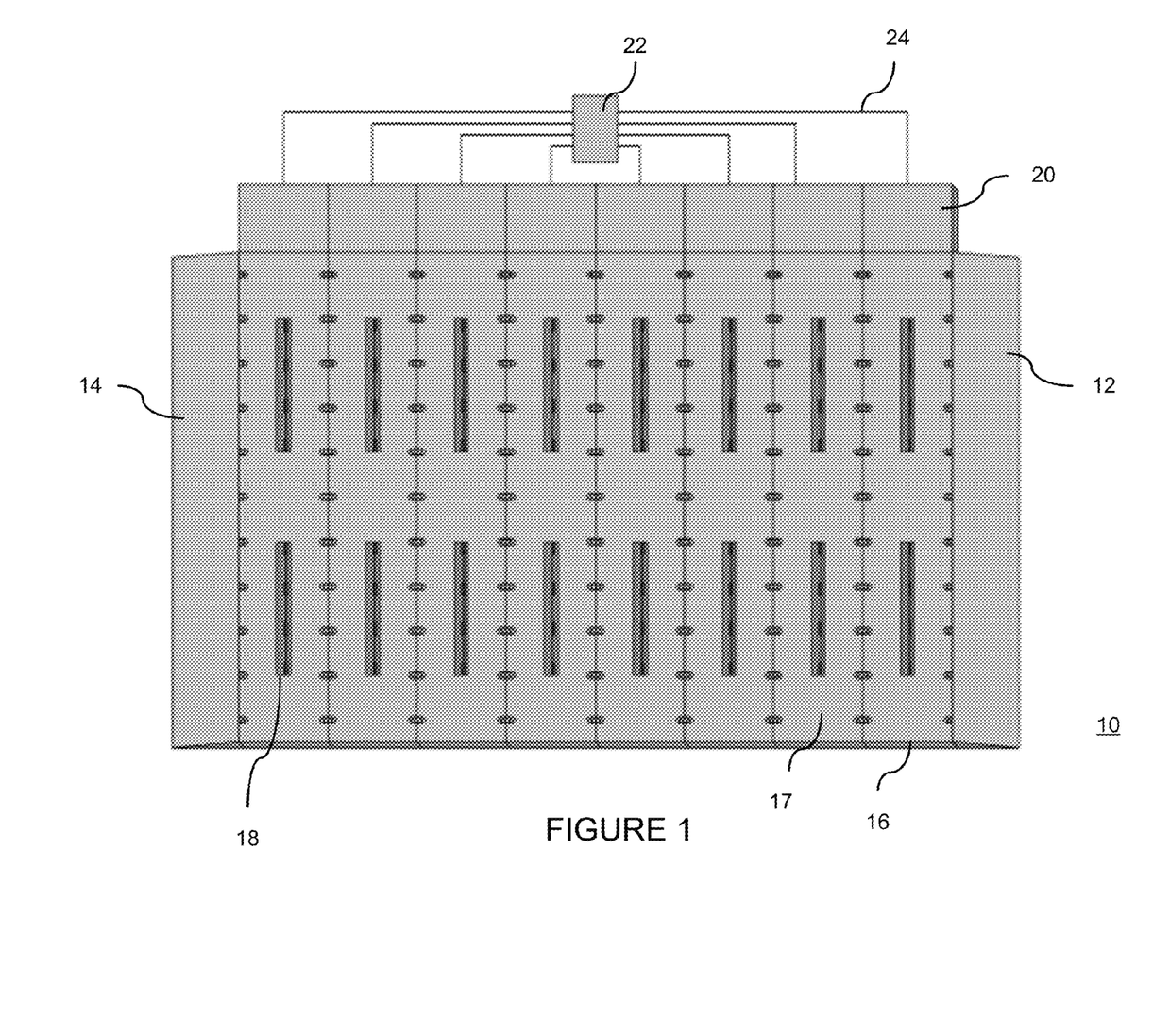
FIG. 1 is a schematic top view of a power absorber unit of an exemplary vehicle energy harvester.

In order to reduce the wear and tear on the treadle assembly, embodiments of the present invention can include a transient absorption means in the form of a torsion spring. In conventional systems, the treadle drive mechanism is attached directly to an electrical generation means. As a result, high speed vehicle impacts with the treadle assembly will cause undue stress on the mechanical components due to the inertia of the electrical generation means connected to it. The exemplary embodiments of the present invention, for example as shown in FIG. 1, reduce the mechanical stress (impulse) on the mechanical components substantially by storing the treadle drive output in a torsion spring which will release its stored energy to the alternator after the vehicle passes over the treadle.

In order to improve the conversion efficiency, the system can include a conversion unit with multiple treadle units having less intrusive or disruptive portions or components that can absorb the vehicles kinetic energy as gently and quietly as possible. As a result of the less disruptive components of the exemplary system, the actual amount of energy derived from each treadle may be relatively small or reduced compared with more disruptive designs. To address this, exemplary embodiments can improve the efficiency with which the system converts the kinetic energy of one or more passing vehicles into useable power.

An exemplary embodiment of the invention is directed to, for example, a vehicle energy harvester including a subunit having an upper surface forming a roadway surface; a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface; a generator that generates power in response to movement of the vehicle activated treadle from the first position to the second position and from the second position to the first position.

Another exemplary embodiment of the invention is directed to, for example, a vehicle energy harvester comprising a plurality of subunits each having an upper surface forming a roadway surface; a plurality of vehicle activated treadles on the plurality of subunits, each of the plurality of vehicle activated treadles moveable between a first position in which an upper surface of the treadle is at an angle with respect to the upper surface of the roadway surface and a second position in which the upper surface of the treadle is flush with the upper surface of the roadway surface; and a plurality of generators that generate power in response to movement of each of the plurality of vehicle activated treadles, wherein at least one generator of the plurality of generators generates power in response to movement of one of the plurality of vehicle activated treadles from the first position to the second position and from the second position to the first position. The vehicle energy harvester includes a reciprocal spring arrangement applying a biasing force on at least one of the plurality of vehicle activated treadles to move the at least one of the vehicle activated treadles away from the second position and toward the first position, a treadle gear coupled to the vehicle activated treadle; a drive gear mounted on a rotatable shaft, and a ratchet gear mounted on the rotatable shaft, wherein the rotatable shaft is coupled to the generator, wherein the drive gear engages and is driven by movement of the at least one of the vehicle activated treadles from the first position to the second position; wherein the ratchet gear rotates freely during movement of the at least one of the vehicle activated treadles from the first position to the second position, and wherein the ratchet gear is driven by movement of the at least one of the vehicle activated treadles from the second position to the first position by the reciprocal spring arrangement.

BRIEF DESCRIPTION OF THE DRAWINGS

These and other aspects and features of embodiments of the present invention will be better understood after a reading of the following detailed description, together with the attached drawings, wherein.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1-4 illustrate exemplary embodiments of a vehicle energy harvester.

The exemplary embodiments can make productive use of the energy that is normally wasted (in the form of heat) in reducing the speed of motor vehicles on exit ramps, toll plazas etc., etc. The vehicle energy harvester can absorb mechanical energy from passing (or breaking) vehicles and convert the mechanical energy to electrical energy using, for example, shaft driven generators. Other means for converting the mechanical energy to electrical energy also are contemplated. In an exemplary embodiment, the electric power from the generators can be converted, metered, and fed into the commercial power grid. In another exemplary embodiment, each site can be equipped with wireless communications to monitor the status and/or output of the system.

Power Absorber Configuration

The disclosed embodiments can include individual assemblies with integral generators. Other generator configurations also are possible, such as separate generators.

As shown in FIG. 1, the vehicle energy harvester unit 10 can be a low-profile surface mounted assembly. The vehicle energy harvester unit 10 can include an entry ramp 12 and an exit ramp 14. The vehicle energy harvester unit 10 can include a plurality of subunits 16 having a top surface or driving surface 17. Each subunit can include one or more vehicle activated treadles 18. In an embodiment, each subunit 16 can include a generator unit 20.

In other embodiments, the vehicle energy harvester unit 10 can be set into the road surface. The surface mounted assembly may require minimal installation effort. Additionally, the unit count can be scaled to road/breaking needs. In an embodiment, each generator unit 20 can feed a common power summing/conversion unit 22. A simple cable interconnect conversion 24 can be provided to connect each generator unit 20 to the common power summing/unit 22. A fail safe configuration can protect the system against individual unit failures.

Power Conversion Unit

In a disclosed embodiment, the individual absorber units 16 can be connected via cable assemblies 24. The input power can be summed and applied to a low-loss inverter unit. The power can be converted immediately to a form that is transmittable to the power grid. The output can be metered and applied to the power grid for transmission.

Absorber Unit Operation

Figure 2:
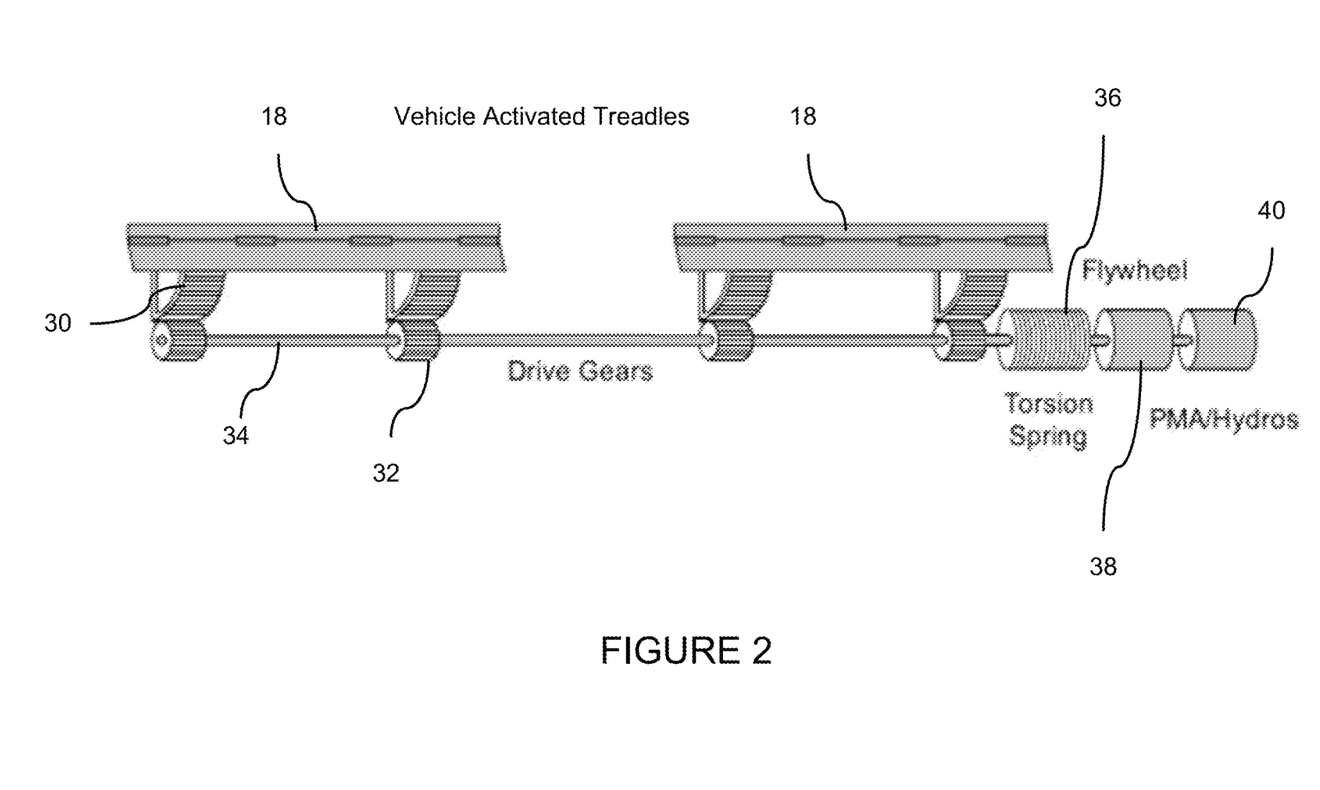
FIG. 2 is a schematic perspective view illustrating a portion of an exemplary vehicle energy harvester.

With reference to FIG. 2, an exemplary embodiment of a subunit 16 of a vehicle energy harvester unit 10 can include spring-loaded treadles 18 having a treadles gear 30 engaging a drive gear 32. The drive gear 32 is coupled to a shaft 34. In operation, one or more vehicle tires force the spring-loaded treadles 18 down as they roll over the treadles 18. The treadle gears 30 drive the plurality of drive gears 32, which rotate the shaft 34. The shaft 34 winds a torsion spring 36, thereby absorbing the treadle drive transient. A pawl can lock the shaft 34 as rotation ends. The torsion spring 36 rotates a flywheel 38, thereby spreading the impulse of the treadle drive over time to extend output to a generator 40. The flywheel 38 can turn a generator 40, such as a hydro pump. The generator 40, in turn, can generate electric power for sale/use/storage.

Transient Absorption Means

Figure 4:
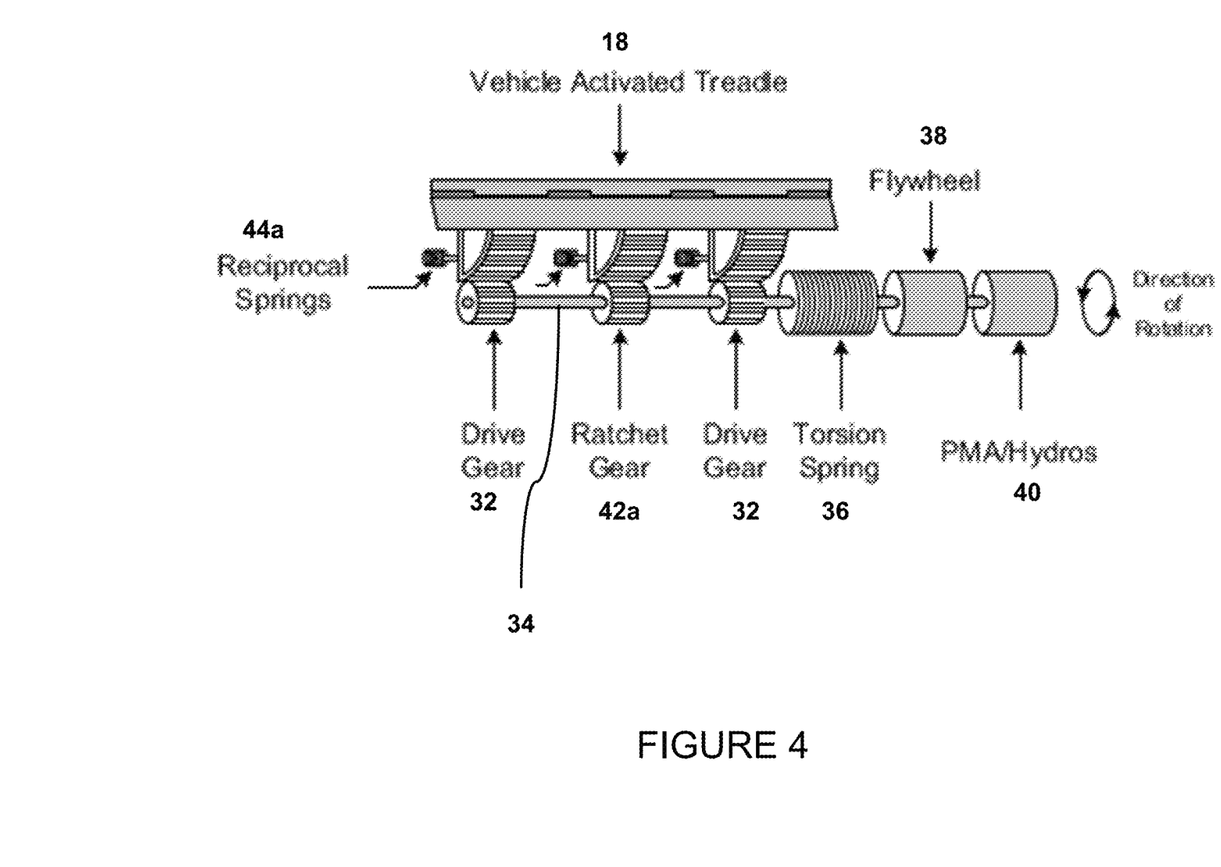
FIG. 4 is a schematic perspective view illustrating a portion of an exemplary vehicle energy harvester.

In order to reduce the wear and tear on the treadle assembly, an exemplary embodiment includes a transient absorption means in the form of a torsion spring 36, as illustrated in FIGS. 2 and 4. In conventional systems, the treadle drive mechanism commonly is attached directly to an electrical generation means. As a result, high speed vehicle impacts with the treadle assembly 18 will cause undue stress on the mechanical components due to the inertia of the electrical generation means (e.g., 40) connected to it. The exemplary embodiments of the present invention, for example as shown in FIGS. 2 and 4, reduce the mechanical stress (impulse) on the mechanical components substantially by storing the treadle drive output in a torsion spring 36 which will release its stored energy to the alternator/generator (e.g., 40) after the vehicle passes over the treadle 18.

More particularly, the torsion spring 36 can provide advantages of absorbing the impulse imparted by fast-moving vehicles striking the treadles 18. The torsion spring 36 also can isolate the treadle assembly from mass/inertia of the connected flywheel 38 and alternator/generator (e.g., 40). The torsion spring 36 further can release stored energy to the electrical charging means (e.g., 40) with very little loss.

Figure 3:
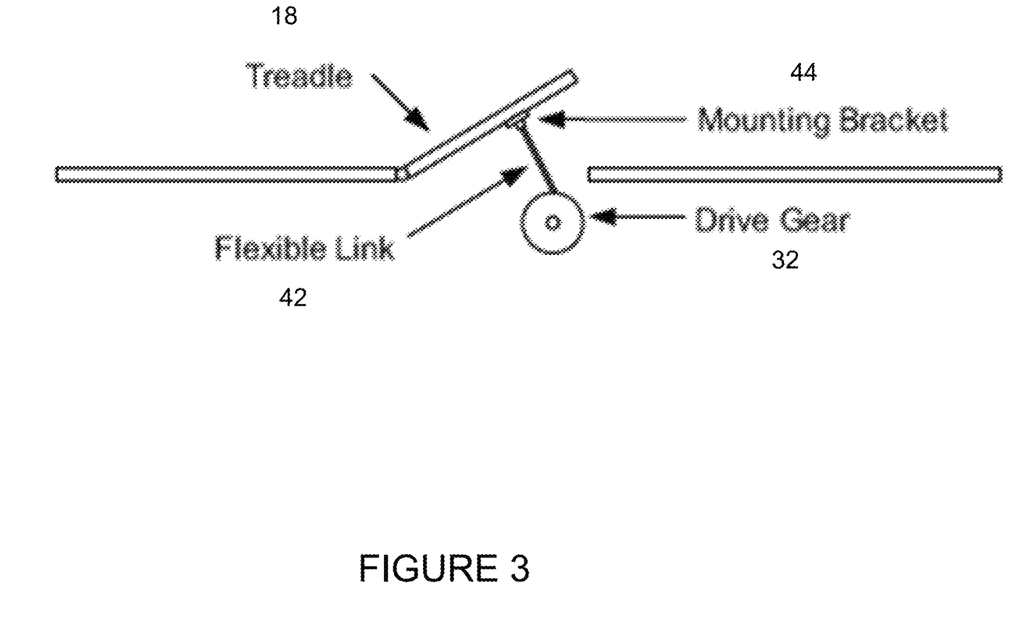
FIG. 3 is a schematic side view illustrating a portion of an exemplary vehicle energy harvester.

As illustrated in FIG. 3, in another embodiment, a flexible link 42 can provide a low-cost alternative. In this embodiment, the vehicle striking the treadle 18 forces the treadle 18 to rotate about its hinged end point. The inertia of the charging system (e.g., 40) resists turning of the drive gear 32. The flexible link 42 can bow (e.g., bend or flex) to absorb impulse then release the energy to the charging system (e.g., 40).

The exemplary embodiments of the invention recognize that a delicate balance must be maintained between the amount of energy absorbed from a vehicle and the resultant disruption to the vehicle and its occupants. Thus, the practicality and safety of the system configuration can be improved by absorbing the vehicle's kinetic energy gradually.

In an exemplary embodiment, the system can include a vehicle energy harvester unit 10 with a plurality of treadle subunits 16 having small (i.e., less intrusive or disruptive) portions or components (e.g., treadles 18) that absorb the vehicles kinetic energy as gently and quietly as possible. As a result of the less disruptive nature of the exemplary system, the actual amount of energy derived from each treadle 18 may be relatively small or reduced compared with more disruptive designs. Therefore, the exemplary embodiments of the invention provide further advantages of improving the efficiency with which the system converts the vehicles kinetic energy. Exemplary embodiments that can improve the conversion efficiency of the system are discussed below.

Reciprocal Spring Arrangement

With reference to FIG. 4, exemplary embodiments for improving the conversion efficiency of the system will now be described.

As exemplarily illustrated in FIG. 4, an exemplary embodiment of the vehicle energy harvester unit 10 can be equipped with a means for moving or returning the treadle 18 back to the active position, such as a reciprocal spring arrangement 44 or assembly. The embodiments recognize that at least a portion of the energy stored in the means (e.g., 44) for moving the treadle 18 back to the active position can be used to continue the generate power, thereby improving the conversion efficiency of the system. One of ordinary skill in the art will recognize that the reciprocating spring assembly 44 or arrangement is not limited to the embodiment illustrated in FIG. 4, and that other arrangements can be provided for performing the desired function of moving the treadle 18 back to the active position can be provided. For example, the reciprocating spring 44 can include one or more springs, such as a compression spring, an extension spring, or a torsion spring, among others, as well as other devices that are capable of storing a portion of the energy imparted by the movement of the treadle or moving the treadle 18 back to the active position, such as a lever arm, a cantilever, a pulley system, etc.

In operation of the exemplary embodiment of FIG. 4, the weight of an oncoming vehicle(s) forces the treadle 18 downward. In response to the downward movement of the treadles 18, one or more drive gears 32 rotate the shaft 34 in a first direction, as indicted by the arrows in FIG. 4. The ratchet gear 42*a* can rotate freely during the downward motion of the treadle 18.

As shown in FIG. 4, one or more springs (e.g., reciprocating springs 44*a*) can be mounted in opposition to the movement of the treadle 18. When the treadle 18 is actuated by the weight of a passing vehicle, one or more of the springs 44*a* are compressed. After the vehicle passes over the treadle 18, the treadle 18 is released from under the weight of the vehicle and the compressed reciprocal springs 44*a* operate to push the treadle 18 back to the ready position.

As explained above, the compression of one or more of the springs 44*a* results in a portion of the energy absorbed from the vehicle being stored in the springs 44*a*. Thus, the conversion efficiency of the system can be improved by using at least a portion of this stored energy in the reciprocating springs 44*a* to continue to apply rotational force to the shaft 34.

Various systems can be implemented to convert a portion of the energy stored in the reciprocating springs 44*a* into continued or additional rotational movement of the shaft 34. For example, as illustrated in FIG. 4, during the movement of the treadle 18 back to the ready or active position, one or more ratchet gears 42*a* can engage in the upward direction and continue to apply rotational force to the shaft 34. By using the attached ratcheting gear 42*a* assembly, some of the energy stored in the springs 44*a* can be used to continue the motion of the permanent magnet alternator (PMA) 40 and thereby provide a backstroke to improve the overall conversion efficiency. Thus, the conversion efficiency of the system can be improved by using at least a portion of the stored energy in one or more of the reciprocating springs 44*a* to continue to apply rotational force to the shaft 34.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

What is claimed is:

1. A vehicle energy harvester comprising:
a subunit having an upper surface forming a roadway surface;
a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface;
a generator that generates power in response to movement of the vehicle activated treadle from the first position to the second position and from the second position to the first position;
a reciprocal spring arrangement applying a biasing force on the vehicle activated treadle to move the vehicle activated treadle away from the second position and toward the first position; and
a transient absorption device coupled between the vehicle activated treadle and the generator, the transient absorption device absorbing transient forces resulting from one or more movements of the vehicle activated treadle from the first position to the second position and gradually releasing the absorbed transient forces to the generator over a period of time.

2. The vehicle energy harvester of claim 1, comprising:
a treadle gear coupled to the vehicle activated treadle; and
a ratchet gear mounted on a rotatable shaft,
wherein the rotatable shaft is coupled to the generator,
wherein the ratchet gear rotates freely during movement of the vehicle activated treadle from the first position to the second position, and
wherein the ratchet gear is driven by movement of the vehicle activated treadle from the second position to the first position by the reciprocal spring arrangement.

3. The vehicle energy harvester of claim 2, wherein the transient absorption device is a torsion spring coupled between the rotatable shaft and the generator.

4. The vehicle energy harvester of claim 3, comprising:
a flywheel coupled between the torsion spring and the generator.

5. A vehicle energy harvester comprising:
a plurality of subunits each having an upper surface forming a roadway surface;
a plurality of vehicle activated treadles on the plurality of subunits, each of the plurality of vehicle activated treadles moveable between a first position in which an upper surface of the treadle is at an angle with respect to the upper surface of the roadway surface and a second position in which the upper surface of the treadle is flush with the upper surface of the roadway surface;
a plurality of generators that generate power in response to movement of each of the plurality of vehicle activated treadles,
wherein at least one generator of the plurality of generators generates power in response to movement of one of the plurality of vehicle activated treadles from the first position to the second position and from the second position to the first position;
a plurality of reciprocal springs applying a biasing force on each of the plurality of vehicle activated treadles to respectively move each of the plurality of vehicle activated treadles away from the second position and toward the first position; and
a plurality of transient absorption devices, each of the plurality of transient absorption devices coupled between one of the plurality of vehicle activated treadles and one of the plurality of generators, each of the transient absorption devices absorbing transient forces resulting from movement of the one of the plurality of vehicle activated treadles from the first position to the second position and gradually releasing the absorbed transient forces to the one of the plurality of generators over a period of time.

6. The vehicle energy harvester of claim 5, comprising:
a treadle gear coupled to one of the plurality of the vehicle activated treadles;
a drive gear mounted on a rotatable shaft, and
a ratchet gear mounted on the rotatable shaft,
wherein the rotatable shaft is coupled to one of the plurality of generators, wherein the drive gear engages and is driven by movement of the one of the vehicle activated treadles from the first position to the second position;

wherein the ratchet gear rotates freely during movement of the one of the vehicle activated treadles from the first position to the second position, and wherein the ratchet gear is driven by movement of the at least one of the vehicle activated treadles from the second position to the first position by one of the reciprocal spring arrangements.

7. The vehicle energy harvester of claim 6, wherein one of the transient absorption devices is a torsion spring coupled between the rotatable shaft and the one of the generators.

8. The vehicle energy harvester of claim 7, comprising: a flywheel coupled between the torsion spring and the one of the generators.

9. The vehicle energy harvester of claim 1, wherein the transient absorption device absorbs transient forces resulting from a plurality of movements of the vehicle activated treadle from the first position to the second position and releases absorbed energy stored in the transient absorption device to turn the generator in a continuous manner.

10. The vehicle energy harvester of claim 2, wherein the reciprocal spring arrangement rotates the shaft during movement of the vehicle activated treadle from the second position to the first position to continue to turn the generator after a vehicle has passed over the vehicle activated treadle.

11. The vehicle energy harvester of claim 5, wherein the transient absorption device absorbs transient forces resulting from a plurality of movements of the vehicle activated treadle from the first position to the second position and releases absorbed energy stored in the transient absorption device to turn the generator in a continuous manner.

12. The vehicle energy harvester of claim 6, wherein each of the plurality of reciprocal springs rotates the shaft during movement of each respective treadle of the plurality of vehicle activated treadles from the second position to the first position to continue to turn the one of the plurality of generators after a vehicle has passed over each respective treadle of the plurality of vehicle activated treadles.

13. The vehicle energy harvester of claim 2, wherein the transient absorption device is a torsion spring, and
wherein the reciprocal spring arrangement rotates the shaft during movement of the vehicle activated treadle from the second position to the first position to continue to turn the torsion spring after a vehicle has passed over the vehicle activated treadle.

14. The vehicle energy harvester of claim 6, wherein each of the transient absorption devices is a torsion spring, and
wherein each of the plurality of reciprocal springs rotates the shaft during movement of each respective treadle of the plurality of vehicle activated treadles from the second position to the first position to continue to turn the torsion spring after a vehicle has passed over each respective treadle of the plurality of vehicle activated treadles.

* * * * *